United States Patent Office 2,908,683
Patented Oct. 13, 1959

2,908,683

PHENTHIAZINE DERIVATIVES

Robert Michel Jacob, Ablon-sur-Seine, Raymond Jacques Horclois, Malakoff, and Edouard Suau, Choisyle Roi, France, assignors to Societe des Usines Chimiques Rhone-Poulenc, Paris, France, a French body corporate No Drawing. Application January 15, 1958
Serial No. 708,983

Claims priority, application France January 15, 1957

6 Claims. (Cl. 260—243)

This invention relates to new derivatives of phenthiazine and to processes for their preparation.

During especially the past decade, considerable research and experimentation have been conducted in the field of N-substituted phenthiazine derivatives and certain of these compounds have been found to possess valuable therapeutic properties. Some are useful primarily on account of outstanding antihistaminic activity, others because of their unusually powerful effect as potentiators of drugs which act upon the nervous system and of their efficacy as anti-shock agents and yet others, for example, are effective agents for controlling or minimising motion-sickness. It has nevertheless been demonstrated that of the very large number of possible N-substituted phenthiazine compounds that have been proposed or tested by various workers, only comparatively few types have useful application in human or veterinary medicine and that both the nature and the degree of useful effect can radically alter even with apparently small changes in chemical structure.

It is an object of the present invention to provide new phenthiazine derivatives which possess unexpectedly useful pharmacological properties. It is a further object of the invention to provide processes for the production of these new compounds.

The phenthiazine derivatives of the present invention are those which conform to the general formula:

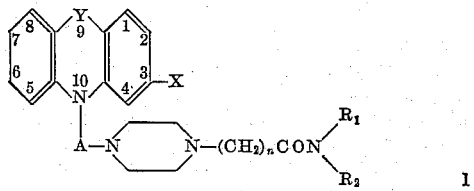

and their salts and quaternary ammonium derivatives, wherein A represents a straight or branched chain divalent saturated aliphatic hydrocarbon group containing 2 to 4 carbon atoms, Y represents a sulphur atom or an SO or $SO_2$ group, X represents a hydrogen or halogen atom or a lower alkyl, alkoxy, acyl or alkoxycarbonyl group or a cyano, methylthio, methanesulphonyl or dimethylsulphamoyl group, $R_1$ and $R_2$ are the same or different and either each represents a hydrogen atom or a lower alkyl, benzyl or cyclohexyl group, or $R_1$ and $R_2$ together with the nitrogen atom to which they are attached collectively represent a pyrrolidino, piperidino or morpholino group and $n$ represents 1 or 2. The word "lower" as applied to alkyl, alkoxy, acyl and alkoxycarbonyl groups means that the group in question contains not more than four carbon atoms.

The new phenthiazine compounds of the present invention may be prepared by the application of known methods for the production of 10-aminoalkyl-phenthiazines. By the words "known methods" as used in this specification is meant methods heretofore employed or described in the chemical literature.

The majority of methods so applied can be described generically as consisting in reacting a phenthiazine derivative of the general formula:

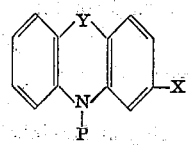

with a compound Q, the groups P and Q being such that Q will react with the phenthiazine derivative so as to introduce or form in the 10-position of the ring a substituent grouping of the structure:

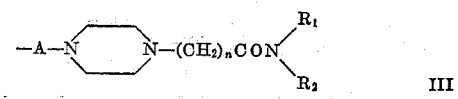

wherein Y, X, A, $R_1$, $R_2$ and $n$ are as hereinbefore defined.

Preferred processes of manufacture are as follows:

(1) Interaction of a phenthiazine derivative of the general formula:

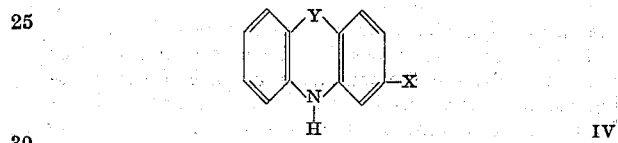

(wherein Y and X are as hereinbefore defined) with a piperazine derivative of the general formula:

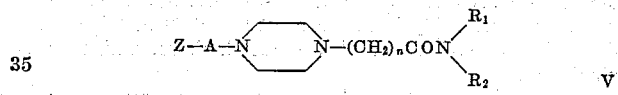

(wherein Z represents the acid residue of a reactive ester, such as a halogen atom or a sulphonic or sulphuric ester residue, and the other symbols are as hereinbefore defined).

(2) Interaction of a phenthiazine derivative of the general formula:

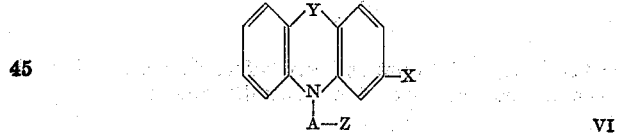

with a piperazine derivative of the general formula:

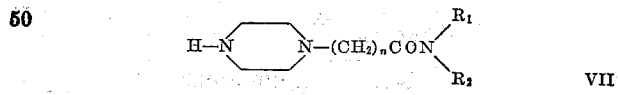

the various symbols being as hereinbefore defined.

(3) Interaction of a phenthiazine derivative of the general formula:

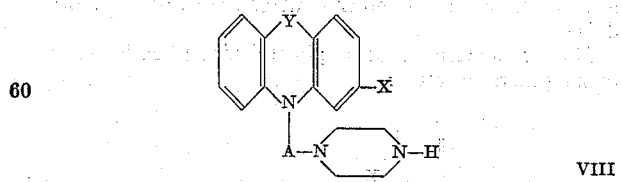

with a reactive ester of the general formula:

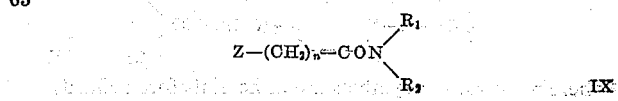

the various symbols being as hereinbefore defined.

(4) Interaction of a phenthiazine derivative of general formula:

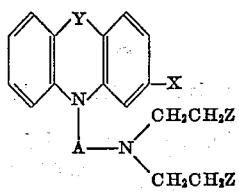   X with an amine of general formula:

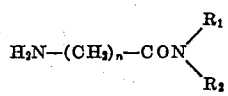   XI the various symbols being as hereinbefore defined.

(5) Interaction of a phenthiazine derivative of the general formula:

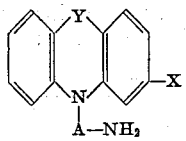   XII with a reactive diester of the general formula:

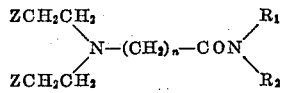   XIII the various symbols being as hereinbefore defined.

The foregoing processes may be carried out with or without a solvent in the presence or absence of a condensing agent. It is generally advantageous to operate in an inert organic solvent medium such as an aromatic hydrocarbon (preferably benzene, toluene or xylene), an ether (for example, diethyl ether) or an amide (for example, dimethylformamide) in the presence of a condensing agent, preferably in the form of an alkali metal or a derivative thereof such as hydroxide, hydride, amide or alcoholate.

The reactions are carried out at room temperature or at an elevated temperature according to the nature of the reactants and the presence or absence of solvent and condensing agent.

(6) Interaction of an amine of the formula

(wherein $R_1$ and $R_2$ are as hereinbefore defined) with a phenthiazine derivative of the general formula:

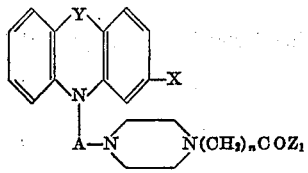   XIV wherein —$COZ_1$ represents a functional group derived from an acid such as an acid halide (preferably chloride), azide or ester, and the other symbols are as hereinbefore defined.

(7) Decomposition of a phenthiazine-10-carboxylate of the general formula:

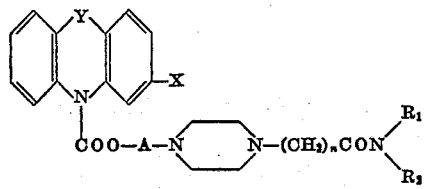   XV (wherein the various symbols are as hereinbefore defined) by heating the carboxylate, preferably to a temperature above 100° C., for example between 150 and 220° C., until evolution of carbon dioxide ceases.

The reaction can be effected with the phenthiazine-10-carboxylate alone, i.e. without a diluent, or in an inert medium of high boiling point such as diphenyl or diphenyl oxide, a chlorinated aromatic hydrocarbon, e.g. o-dichlorobenzene, or in the classical diluents for decarboxylation such, for example, as quinoline or weak bases.

(8) Cyclisation, preferably in a solvent in the form of a substituted amide of a lower aliphatic acid in the presence of a condensing agent such as an alkali metal hydroxide or carbonate and optionally in the presence of a catalyst such as copper powder, of a compound of the general formula:

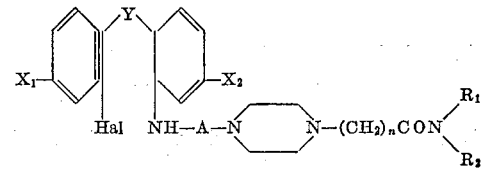   XVI (wherein one of $X_1$ and $X_2$ represents a hydrogen atom and the other the group X, Hal represents a halogen atom, preferably chlorine or bromine, and the other symbols are as hereinbefore defined).

(9) In the case of compounds of general Formula I where Y is a sulphur atom, heating in the presence of sulphur or one of its derivatives and optionally with a catalyst such as iodine, a diphenylamine of general formula:

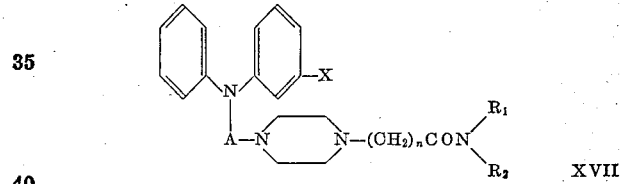   XVII where the various symbols are as hereinbefore defined.

(10) In the case of compounds of general Formula I where Y represents an SO or $SO_2$ group, oxidation by known methods of the corresponding phenthiazine derivatives in which Y represents a sulphur atom or an SO group. The oxidation may be effected with, for example, hydrogen peroxide or nitric or chromic acid.

The phenthiazine derivatives of the present invention possess interesting pharmacodynamic properties; in particular, they are very active as sedatives, antiemetics, cataleptics, or antihistaminics. Their sedative activity may be illustrated by classical tests such as potentiation of narcosis, conditioned reflex and that of Winter and Flataker. Their antiemetic activity may be demonstrated, for example, by the reduction in vomiting produced by apomorphine in the dog. The compounds which are particularly active are those of general Formula I in which the hydrocarbon chain A is —$(CH_2)_3$—.

For therapeutic purposes, the bases of general Formula I are preferably employed as such or in the form of acid addition salts containing anions which are relatively innocuous to the animal organism in therapeutic doses of the salts (such as hydrochlorides and other hydrohalides, phosphates, nitrates, sulphates, maleates, fumarates, citrates, tartrates, oxalates, methanesulphonates and ethanedisulphonates) so that the beneficial physiological properties inherent in the bases are not vitiated by side-effects ascribable to the anions. However, they may also be employed in the form of quaternary ammonium salts obtained by reaction with organic halides (e.g. methyl or ethyl iodide, chloride or bromide or allyl or benzyl chloride or bromide) or other reactive esters, e.g. toluene-p-sulphonates.

The following examples, in which the melting points indicated were determined on the Kofler bench, illustrate the invention.

Example I

1 - [3 - (3 - chloro - 10 - phenthiazinyl)propyl]piperazine (9 g.) is heated under reflux with agitation for 20 hours with N-dimethyl-chloroacetamide (3.3 g.), anhydrous potassium carbonate (2 g.), and anhydrous toluene (75 cc.). Distilled water (100 cc.) is added and the toluene solution is washed with water (50 cc. and 30 cc.). The toluene layer is agitated with 10% hydrochloric acid (50 cc.), the aqueous acid layer is decanted, the base liberated with sodium hydroxide ($d=1.33$, 20 cc.) and the base extracted with ether (3 x 50 cc.). The ethereal layer is dried over sodium sulphate and concentrated. A crude base (11 g.) is obtained. The hydrochloride (11 g.) is obtained by treatment with ethereal hydrogen chloride. The base is liberated with dilute sodium hydroxide, extracted with benzene and recrystallised from heptane (250 cc.). 1 - [3 - (3 - chloro - 10 - phenthiazinyl)propyl]-4-dimethylcarbamoylmethylpiperazine (7 g.) is obtained, M.P., 134° C.

Example II

1 - [3 - (3 - chloro - 10 - phenthiazinyl)propyl]piperazine (7.2 g.) is heated under reflux, with stirring, for 20 hours with chloroacetamide (2.1 g.), potassium carbonate (2.8 g.) and anhydrous toluene (75 cc.). Distilled water (100 cc.) is added and the toluene solution is washed with water (50 cc. and 30 cc.). After shaking the toluene layer with 10% hydrochloric acid (50 cc.), the aqueous acid layer is decanted. The base is liberated with sodium hydroxide ($d=1.33$; 20 cc.) and extracted with chloroform (3 x 50 cc.). The chloroform solution is dried over sodium sulphate and evaporated to dryness. On recrystallisation of the residue from isopropanol, 1-[3-(3-chloro-10 - phenthiazinyl)propyl] - 4 - carbamoylmethyl-piperazine (6 g.), M.P. 134° C., is obtained.

Example III

Proceeding as in Example II but starting with β-chloropropionamide (2.15 g.), 1-[3-(3-chloro-10-phenthiazinyl)-propyl]-4-carbamoylethyl-piperazine (6.5 g.), M.P. 128° C., is obtained after recrystallisation from a mixture of cyclohexane and benzene.

Example IV

Proceeding as in Example II but starting with N-dimethyl-2-chloropropionamide (2.8 g.), followed by reaction of the product with maleic acid in ethyl acetate, 1 - [3 - (3 - chloro - 10 - phenthiazinyl)propyl] - 4 - dimethylcarbamoylethyl-piperazine acid dimaleate (5.3 g.), M.P. 180° C., is obtained.

Example V

Proceeding as in Example II but starting with N-diethylchloroacetamide (3 g.), a crude base (7 g.) is isolated from which the hydrochloride is prepared in isopropanol. 1 - [3 - (3 - chloro - 10 - phenthiazinyl)-propyl] - 4 - diethylcarbamoylmethyl - piperazine dihydrochloride (5.5 g.), M.P. 128° C., is obtained.

Example VI

Proceeding as in Example II but starting with chloroacetomorpholide (3.3 g.), 1 - [3 - (3 - chloro - 10 - phenthiazinyl)propyl] - 4 - morpholinocarbonylmethylpiperazine (6.4 g.), M.P. 128° C., is obtained after recrystallisation from ethyl acetate.

Example VII

Proceeding as in Example II but starting with chloroacetopiperidide (3.2 g.), a base is isolated from which the hydrochloride is prepared in isopropanol. 1-[3-(3-chloro - 10 - phenthiazinyl)propyl] - 4 - piperidinocarbonylmethyl-piperazine dihydrochloride (4.8 g.), M.P. 225° C., is obtained.

Example VIII

Proceeding as in Example II but starting with chloroacetopyrrolidide (3.0 g.), a base (8 g.) is isolated which is converted in isopropanol into 1-[3-(3-chloro-10-phenthiazinyl)propyl] - 4 - 1' -pyrrolidinylcarbonylmethyl-piperazine dihydrochloride, M.P. 245° C.

1 - [3 - (3 - chloro - 10 - phenthiazinyl)propyl]- 4-1'-pyrrolidinylcarbonylmethyl-piperazine (2.2 g.) is heated under reflux on a water bath for 7 hours with methyl iodide (20 cc.). On concentration, the dimethiodide (2.7 g.) of 1-[3-(3-chloro-10-phenthiazinyl)propyl]-4-1'-pyrrolidinylcarbonylmethyl-piperazine is obtained, which on recrystallisation from 95% ethanol melts at 242° C.

Example IX

3 - (3 - methoxy - 10 - phenthiazinyl)propyl toluene-p-sulphonate (11 g.) and 1-dimethylcarbamoylmethyl-piperazine (4.6 g.) are heated under reflux with stirring for 4 hours with potassium carbonate (3.5 g.) in methylethyl ketone (75 cc.). Methylethyl ketone (60 cc.) is distilled off, chloroform (50 cc.) added and the mixture washed with water (2 x 25 cc.). The chloroform layer is shaken with N hydrochloric acid solution (60 cc.), the aqueous acid layer decanted and the base liberated with sodium hydroxide ($d=1.33$; 15 cc.). The base is extracted into chloroform (3 x 20 cc.) and the chloroform layer dried over sodium sulphate and concentrated. The hydrochloride, prepared in isopropanol, has a melting point of about 225° C. When reconverted into the base and recrystallised from ether, 1-[3-(3-methoxy-10-phenthiazinyl)propyl] - 4 - dimethylcarbamoylmethyl-piperazine (4.3 g.), M.P. 95° C., is obtained.

1-dimethylcarbamoylmethyl-piperazine is obtained by heating N-dimethylchloroacetamide (24.4 g.) with anhydrous piperazine (69 g.), sodium iodide (30 g.) and methylethyl ketone (800 cc.) under reflux for 16 hours. Methylethyl ketone (780 cc.) is distilled off and the residue taken up in benzene (200 cc.), cooled and the excess piperazine filtered off. The filtrate is distilled in vacuo. 1-dimethylcarbamoylmethyl-piperazine (28 g.), B.P. 105–109° C./0.3 mm. Hg, is obtained.

Example X

Proceeding as in Example IX, but starting with 1-(3 - chloro - 10 - phenthiazinyl) - 2 - propyl toluene - p-sulphonate (11.2 g.) and heating under reflux for 17 hours, 1 - [1 - (3 - chloro - 10 - phenthiazinyl) - 2-propyl] - 4 - dimethylcarbamoylmethyl - piperazine (3.5 g.) is obtained, the hydrochloride of which, prepared in isopropanol, melts at 230° C.

Example XI

10 - (2 - chloroethyl) - phenthiazine (6.5 g.) is heated under reflux, with stirring, for 16 hours with 1-dimethyl-carbamoylmethylpiperazine (4.6 g.) and potassium carbonate (3.5 g.) in xylene (75 cc.). By treatment of the reaction mixture as previously described, a crude base (9 g.) is isolated, from which the dihydrochloride, M.P. 215° C., is prepared in ethanol. The base is liberated from the dihydrochloride by the action of an alkali to obtain 1-[2-(10-phenthiazinyl)ethyl]-4-dimethyl-carbamoylmethyl-piperazine, M.P. 95° C.

Example XII

3 - dimethylsulphamoylphenthiazine (6 g.) is heated under reflux with stirring for 4 hours with xylene (50 cc.) and sodamide (1 g.). 1-(3-chloropropyl)-4-dimethylcarbamoylmethyl - piperazine (5.5 g.) in solution in xylene (30 cc.) is then added dropwise over 30 minutes. The mixture is again refluxed for 16 hours. By treatment of the reaction mixture as previously described 1-[3-(3-dimethylsulphamoyl - 10 - phenthiazinyl)-propyl] - 4-dimethylcarbamoylmethyl - piperazine (5 g.) is isolated, which is converted into its dimethanesulphonate, M.P. 165° C.

1 - (3 - chloropropyl) - 4 - dimethylcarbamoylmethyl-piperazine dihydrochloride (43 g.), M.P. 225° C., is obtained by the action of thionyl chloride (18 g.) in chloroform (300 cc.) on 1-(3-hydroxypropyl)-4-dimethylcarbamoylmethyl-piperazine (31 g.) in the form of its dihydrochloride.

1 - (3 - hydroxypropyl) - 4 - dimethylcarbamoylmethyl-piperazine (31.5 g.), B.P. 172° C./0.4 mm. Hg, is obtained by reacting 1-chloropropan-3-ol (15.7 g.) with 1 - dimethylcarbamoylmethyl - piperazine (59 g.) at about 130° C. The same product may also be prepared by the action of N-dimethyl-chloroacetamide on 1-(3-hydroxypropyl)-piperazine.

Example XIII

3 - chlorophenthiazinyl - 10 - carbonyl chloride (15 g.) is heated in an oil bath at 125° C. with stirring for 15 hours with 1-(3-hydroxypropyl)-4-dimethylcarbomylmethyl-piperazine (11.5 g.) and toluene (10 cc.). Water (20 cc.) and N sodium hydroxide (50 cc.) are added and the mixture is shaken with chloroform (50 cc.) and washed with chloroform (2 x 25 cc.). The combined chloroform extracts are shaken with N hydrochloric acid (100 cc.) and the aqueous acid layer decanted. Sodium hydroxide ($d=1.33$; 25 cc.) is added and the base extracted with chloroform (50 cc. and 2 x 25 cc.). 1-[3-(3-chloro - 10 - phenthiazinyl) carbonyloxypropyl] - 4 - dimethylcarbamoylmethyl - piperazine (16.5 g.) is obtained, the dimethylsulphonate of which, on recrystallisation from ethanol melts at 280° C.

1 - [3 - (3 - chloro - 10 - phenthiazinyl) carbonyloxypropyl] - 4 - dimethylcarbamoylmethyl - piperazine (4.2 g.) is heated in a flask under a pressure of from 1 to 2 mm. of mercury at about 200–240° C. for 15 minutes until the evolution of carbon dioxide ceases and the pressure is maintained at 0.6 mm. of mercury. After treatment with ether (50 cc.) and N hydrochloric acid (12 cc.), the mixture is left to stand overnight. The hydrochloride which crystallises is filtered off and treated with N sodium hydroxide (20 cc.) and ether (100 cc.). The ethereal layer is dried over potassium carbonate and concentrated in vacuo. 1-[3-(3-chloro-10-phenthiazinyl)-propyl] - 4 - dimethylcarbamoylmethyl - piperazine (2.5 g.), M.P. 134° C. after crystallisation from heptane, is obtained.

Example XIV

1 - [3 - (3 - chloro - 10 - phenthiazinyl)propyl] - 4-methoxycarbonylmethyl - piperazine dihydrochloride (1.2 g.) is heated under reflux on the waterbath for 7 hours with stirring with piperidine (10 cc.). The mixture is concentrated in vacuo, treated with water, sodium hydroxide and chloroform. After concentration, the hydrochloride of the product is prepared in isopropanol by the action of ethereal hydrogen chloride. 1-[3-(3-chloro-10 - phenthiazinyl)propyl] - 4 - piperidinocarbonylmethyl - piperazine dihydrochloride (0.7 g.), M.P. 225° C., is obtained.

1 - [3 - (3 - chloro - 10 - phenthiazinyl)propyl] - 4-methoxycarbonylmethyl - piperazine dihydrochloride (6.2 g.), M.P. 220° C., is prepared by heating under reflux for 8 hours 1-[3-(3-chloro-10-phenthiazinyl)propyl]-piperazine (9 g.) with methyl bromoacetate (3.8 g.) and potassium carbonate (3.9 g.) in methylethyl ketone (75 cc.), isolating the base obtained and preparing the hydrochloride in isopropanol by the action of ethereal hydrogen chloride.

Example XV

1 - [3 - (3 - chloro - 10 - phenthiazinyl)propyl]-piperazine (7.2 g.) is heated under reflux for 10 hours with stirring with N-methyl-chloroacetamide (2.2 g.), potassium carbonate (2.8 g.) and toluene (75 cc.). Distilled water (100 cc.) is added and decanted. The toluene layer is shaken with 10% hydrochloric acid (50 cc.), decanted, the base liberated with sodium hydroxide and extracted with chloroform. The chloroformic solution is concentrated and by the action of ethereal hydrogen chloride on the base dissolved in isopropanol there is obtained 1-[3 - (3 - chloro - 10 - phenthiazinyl)propyl]-4 - methylcarbamoylmethylpiperazine dihydrochloride (6.3 g.), M.P. 220° C.

Example XVI

Proceeding as in Example XV but starting with N-cyclohexylchloroacetamide (3.5 g.), there is obtained 1 - [3 - (3 - chloro - 10 - phenthiazinyl)propyl] - 4-cyclohexylcarbamoylmethyl - piperazine (7 g.), M.P. 130° C. after recrystallisation from ethyl acetate.

Example XVII

Proceeding as in Example XV but commencing with N - benzyl - chloroacetamide (4 g.), there is obtained 1 - [3 - (3 - chloro - 10 - phenthiazinyl)propyl] - 4-benzylcarbamoylmethyl - piperazine dihydrochloride (11 g.), M.P. 228° C.

Example XVIII

Proceeding as in Example XV but commencing with 1 - [3 - (3 - cyano - 10 - phenthiazinyl)propyl]piperazine (6 g.) and chloroacetopyrrolidide (2.8 g.), there is obtained a base (6.8 g.) from which is prepared with maleic acid (3.5 g.) in ethanol 1 - [3 - (3 - cyano - 10 - phenthiazinyl)propyl] - 4 - 1' - pyrrolidinylcarbonylmethylpiperazine acid dimaleate (8.5 g.), M.P. 180° C.

Example XIX

3 - (3 - methylthio - 10 - phenthiazinyl)propyl toluene-p-sulphonate (4.5 g.) is heated under reflux with stirring for 20 hours with 1-1'-pyrrolidinylcarbonylmethylpiperazine, (4 g.), M.P. 90° C., and methylethyl ketone (80 cc.). By the usual treatment a base is isolated (4.8 g.) from which is prepared with maleic acid (2.3 g.) in ethanol 1-[3-(3-methylthio-10-phenthiazinyl)propyl]-4-1'-pyrrolidinylcarbonylmethyl-piperazine acid dimaleate (5 g.), M.P. 170° C.

The 1-1'-pyrrolidinylcarbonylmethyl-piperazine is obtained by the condensation of chloroacetopyrrolidide with anhydrous piperazine in methylethyl ketone under reflux for 16 hours in the presence of sodium iodide.

Example XX

1 - [3 - (3 - chloro-10-phenthiazinyl)propyl]-4-carbamoylethyl-piperazine (2.15 g.), M.P. 128° C., is dissolved in N hydrochloric acid (10 cc.) and water (15 cc.). Nitric acid ($d=1.38$, 10 cc.) is added dropwise at normal temperature. An intense violet red colour develops with oxides of nitrogen, a colouration which disappears in a few minutes leaving a clear pale yellow solution. The solution is cooled and after 5 minutes sodium hydroxide ($d=1.33$, 20 cc.) is added. The base which is precipitated is extracted with chloroform (3 x 20 cc.); the chloroformic solution is dried over potassium carbonate and evaporated on the water-bath. 1 - [3 - (3-chloro-9-oxy-10-phenthiazinyl)propyl]-4-carbamoylethyl-piperazine (1.6 g.), M.P. 176° C., is obtained on recrystallisation from benzene.

Example XXI

A solution of 3-(3-chloro-9:9-dioxy-10-phenthiazinyl) propyl toluene-p-sulphonate (4.8 g.) and 1-1'-pyrrolidinylcarbonylmethyl-piperazine (4 g.) in methylethyl ketone (80 cc.) is heated under reflux for 17 hours. The solvent is removed at ordinary pressure and the residue treated with water (50 cc.) and extracted with chloroform (50 cc.). The chloroform solution is washed with water (4 x 30 cc.) and dried over anhydrous sodium sulphate. The solvent is removed under a pressure of 13 mm. of mercury by heating to 80° C. The crude residual base is dissolved in a mixture of benzene and cyclohexane (1:1) and the solution is filtered through an alumina column for chromatography. By eluting with a benzene-ethyl acetate mixture (1:1), the pure base is isolated. 1 - [3 - (3-chloro-9:9-dioxy-10-phenthiazinyl)propyl]-4-1'-pyrrolidinylcarbonylmethyl-piperazine is thus obtained as a white crystalline powder, M.P. 176° C.

We claim:
1. A member of the class consisting of a phenthiazine derivative of the general formula:

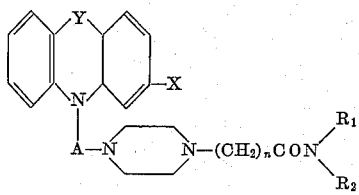

and its acid addition salts having pharmaceutically inert anions and quaternary ammonium derivatives formed with lower alkyl esters selected from the class consisting of lower alkyl halides and lower alkyl toluene-p-sulphonates, wherein A is a member of the class consisting of straight and branched chain divalent saturated aliphatic hydrocarbon groups containing 2 to 4 carbon atoms, Y is a member of the class consisting of a sulphur atom and SO and $SO_2$ groups, X is a member of the class consisting of hydrogen and halogen atoms and lower alkyl, lower alkoxy, lower alkylcarbonyl and lower alkoxycarbonyl groups and cyano, methylthio, methanesulphonyl and dimethylsulphamoyl groups, $R_1$ and $R_2$ when individual groups each is a member of the class consisting of a hydrogen atom and lower alkyl, benzyl and cyclohexyl groups, and $R_1$ and $R_2$ when joined together form with the nitrogen atom to which they are attached a member of the class consisting of pyrrolidino, piperidino and morpholino groups and $n$ is an integer selected from 1 and 2.

2. 1 - [3 - (3 - chloro-10-phenthiazinyl)propyl]-4-dimethylcarbamoylmethyl-piperazine.

3. 1 -[3 - (3 - methoxy-10-phenthiazinyl)propyl]-4-dimethylcarbamoylmethyl-piperazine.

4. 1 - [3 - (3 - dimethylsulphamoyl-10-phenthiazinyl) propyl]-4-dimethylcarbamoylmethyl-piperazine.

5. 1 - [3 - (3 - cyano - 10-phenthiazinyl)propyl]-4-1'-pyrrolidinylcarbonylmethyl-piperazine.

6. 1 - [3 - (3 - methylthio-10-phenthiazinyl)propyl]-4-1'-pyrrolidinylcarbonylmethyl-piperazine.

References Cited in the file of this patent
UNITED STATES PATENTS 2,827,459   Horclois et al. _____ Mar. 18, 1958

FOREIGN PATENTS 88,388   Norway _____ Nov. 26, 1956
293/55   Union of South Africa ____Aug. 22, 1955